Oct. 15, 1940.  C. J. HOLINGER  2,217,841
APPARATUS FOR CARBONATING WATER
Filed Sept. 13, 1937
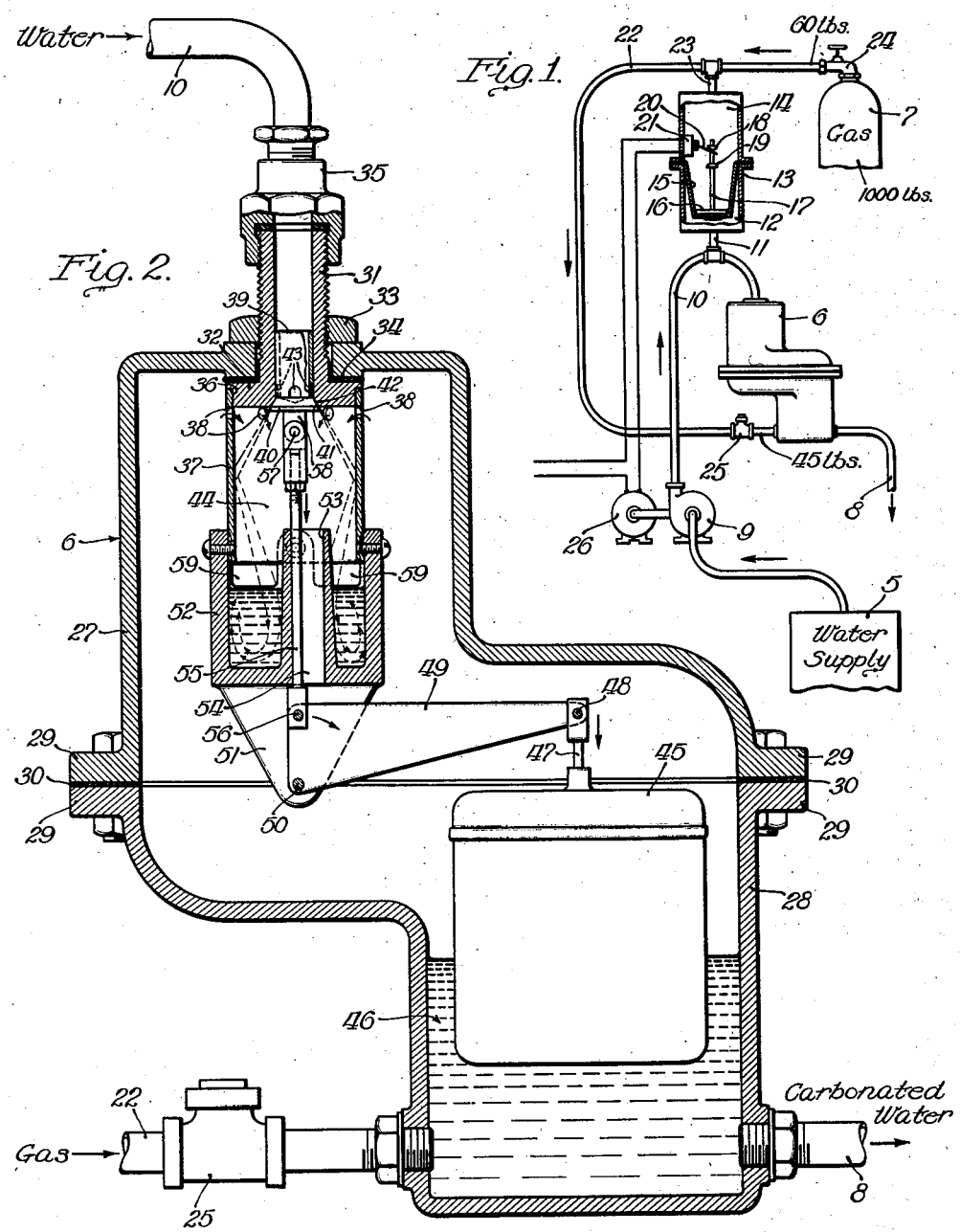
Inventor:
Carl J. Holinger
By: Fisher, Clapp, Soans & Pond
Attys.

Patented Oct. 15, 1940

2,217,841

UNITED STATES PATENT OFFICE 2,217,841

APPARATUS FOR CARBONATING WATER

Carl J. Holinger, Chicago, Ill.

Application September 13, 1937, Serial No. 163,577

6 Claims. (Cl. 261—27)

This invention relates to an improved carbonator construction, that is, a device for charging water with carbonic acid gas to make carbonated water such as used for beverage purposes.

The main objects of the invention are to provide a carbonator of simple and relatively inexpensive, but durable and efficient construction and which will be especially efficient in respect of its ability to fully charge the water with the gas. It is also an object of the invention to provide a carbonator of small size, especially suited for employment in so-called drink-vending machines, the over-all size of which must, for practical reasons, be maintained as small as possible.

A further object of the invention is to provide a carbonator which will effectively charge small quantities of water as fast as like quantities of charged water are withdrawn.

Another important object of the invention is to provide an apparatus for carbonating water which will facilitate or accelerate the absorption of carbonic gas in the water.

In general, it is the object of the invention to provide an improved carbonator of the type indicated.

Other objects and advantages of the invention will be understood by reference to the following specification and accompanying drawing, wherein there is illustrated a carbonator and its association with other elements of a so-called drink-vending machine.

In the drawing—

Fig. 1 is a more or less diagrammatic illustration indicating certain elements of a drink-vending machine, including the improved carbonating device in their operative relationship, and Fig. 2 is a vertical section through the carbonating device.

Referring now to the drawing, and particularly Fig. 1 thereof, there is illustrated at 5 a water reservoir which constitutes the source of water to be charged in the carbonating device which in its entirety is indicated at 6. A commercial tank of carbonic acid gas is indicated at 7, the same constituting the source of gas with which the water is to be charged. By means of suitable connections gas and water are delivered to the carbonating device 6 under predetermined pressures so that the gas is absorbed by the water, charged water being withdrawn from the carbonator through the outlet conduit indicated at 8.

As shown in the drawing, an electrically driven pump 9 is provided for supplying water from the reservoir 5 to the carbonator 6, the water being delivered by the pump through the conduit 10 to the upper part of the carbonator. A branch 11 connects the water conduit 10 with a chamber 12 in an equalizing device 13. The details of the equalizing device are not a part of the present invention, wherefore such device has been shown in more or less schematic form in Fig. 1.

As shown in Fig. 1, the equalizing device 13 comprises a hollow receptacle which is divided into chambers 12 and 14 by means of a rubber or other flexible diaphragm 15. The diaphragm is equipped with a disk 16 which provides rigidity in a central portion thereof and a centrally located stem or post 17 extends upwardly from the said disk. The disk and stem are securely attached to the diaphragm in any suitable manner. The upper portion of the stem 17 is provided with a pair of relatively spaced stops or collars 18 and 19 which are adapted to engage and actuate a switch arm 20 for controlling an electric switch 21. The switch 21 is interposed in an electric circuit which supplies power to a motor designated 26 for operating the pump 9.

Carbonic acid gas is supplied from the tank 7 through a conduit 22 to the lower portion of the carbonator 6 and a branch 23 from said conduit 22 communicates with the chamber 14 of the equalizing device so as to deliver the gas to said chamber. The gas in the tank 7 is supplied under high pressure, for example, 1000 pounds, and a reducing valve indicated at 24 is provided for effecting delivery of the gas at a predetermined pressure, for example, 60 pounds. Thus it will appear that the gas is delivered from the tank 7 to the chamber 14 of the equalizer under a pressure of 60 pounds, thereby placing the water also under 60 pounds pressure. Another pressure reducing valve indicated at 25 is provided in the conduit 22 to further reduce the pressure of the gas before its delivery to the carbonator 6. The valve 25 will maintain a predetermined differential in pressure between the gas in the equalizer and the gas in the carbonator. Said predetermined pressure differential may, for example, be approximately one atmosphere (15 pounds) at 60 pounds equalizing pressure. The valve 25 may, for example, be such as to effect delivery of the gas to the carbonator under a pressure of 45 pounds.

The carbonator 6 comprises in this instance a sealed receptacle formed of upper and lower receptacles, 27, 28, which may in practice be duplicates except for the drilling and tapping thereof at different places as will presently appear. In the drawing, bosses are illustrated only at the points at which the respective sections are tapped, but it will be understood that for practical purposes the necessary bosses may be provided on both sections and that only those required as indicated need be drilled and tapped. In this way the cost of production of the device is maintained at a minimum, since but one form of receptacle need be manufactured, two of them being employed together to form a complete enclosure. Such receptacles may be bolted together through flanges such as indicated at 29, a suitable gasket 30 being interposed to insure tightness of the joint.

The water conduit 10 is connected to the upper end of the carbonator casing through the agency of a tubular member 31 having a head 32 at one end and a nut 33 engaging external screw-threading and serving to clamp the member in place as shown. A gasket such as indicated at 34 may be employed to insure a leak-proof joint between the member 31 and the casing. Suitable coupling means such as indicated at 35 may be employed for connecting the conduit 10 to the upper end of the tubular member 31.

The head 32 of the tubular member is provided with a recessed seat 36 for receiving a tubular or sleeve-like member 37, the latter having its upper end fitting said recessed seat and suitably secured to the head, for example, by soldering, screws or the like. The tubular member 37 is open at its lower end and adjacent its upper end is provided with a plurality of openings 38 which permit the entrance of gas into the interior of the tube 37 as will presently appear.

A valve member 39 is positioned within the tubular member 31, the said member comprising a cylindrical tube portion which slidably fits within the tubular member 31 and a flaring or beveled head portion 40. The beveled face 41 of the head portion is adapted to fit a correspondingly beveled valve seat 42 formed at the lower end of the tubular member 31. Openings such as indicated at 43 are provided at the lower end of the tubular portion of the valve member for permitting the passage of water from the interior of said tubular portion into the chamber designated 44 within the tube 37 when the valve element is opened.

The valve member 39 is normally held closed or seated on the valve seat 42 by a float 45 which is supported by charged water indicated at 46 in the lower portion of the carbonator. The upper end of the float is provided with an upwardly extending stem 47 which is suitably pivotally connected as indicated at 48 to the outer end of a lever 49 which is pivoted at its other end as indicated at 50 on a bracket or between brackets such as indicated at 51. The bracket or brackets 51 are formed integral with a cup-like member 52 which, at its upper end, embraces and is secured to the lower end portion of the tubular member 37. Soldering or screw fastenings may be employed for rigidly securing the cup-like member 52 to the tubular member 37. The cup member 52 is provided with an upwardly extending centrally located boss or hub-like part 53 which is apertured as indicated at 54 for movably receiving a link 55. The link 55 is pivoted at one end as indicated at 56 to the lever 49 and at its other end as indicated at 57 to a lug 58 which depends from the head of the valve member 39. The arrangement is such that when the valve 39 is closed, the pivot centers 50, 56 and 57 will be in vertical alignment, preferably slightly short of vertical alignment, so that the upward pressure of the float 45 has a definite tendency to hold the valve 39 in tightly seated closed relation to the valve seat 42. In the drawing, the said pivot centers are shown in vertical alignment, this arrangement representing the theoretic closed position. However, it will be understood that as a practical matter the pivot centers need not reach such actual vertical alignment but may be disaligned slightly so as to cause all of the upward pressure produced by the float 45 to be transmitted to the valve seat 42, thereby to insure tight closing of the valve under proper conditions. The opening 54 which receives the link 55 is preferably just wide enough to permit the link 55 to move freely therein both vertically and laterally, and it is of course of sufficient width in the direction of movement of the link 55 to permit unobstructed movement as required by the shifting of the pivot center 56 incident to vertical movement of the float 45.

The cup member 52 is provided adjacent its upper end with recesses or openings 59—59 through which water trapped in the cup may flow from the cup into the lower portion of the carbonator when fresh water is injected.

When charged or carbonated water is withdrawn from the lower portion of the carbonator through the conduit 8, the float 45 will of course be lowered. Upon such lowering, the valve 39 is also lowered so as to permit the passage of water from the conduit 10 through the openings 43 and between the valve face and seat 41 and 42 into the chamber 44. It will be apparent that the extent of opening provided between the valve face and valve seat 41 and 42 will be relatively small and that the water passing therebetween will accordingly be discharged in relatively small or fine streams if not actually in spray form.

It will be apparent that the water is delivered to the carbonator under a pressure higher than the gas pressure within the carbonator (owing to the equalizer and the gas pressure reducing valve described), so that the streams or sprays of water delivered into the chamber 44 are delivered under sufficient force to cause them to impinge and rebound from the inside surfaces of the tubular member 37 as represented by dotted lines in Fig. 2. Because of the great pressure at which the water is delivered, it will be broken up into a spray consisting of small globules of water each of which present a very large surface area to the gas content of the carbonator. Hence, each globule of water easily absorbs a maximum charge of gas. As already indicated the gas is delivered to the carbonator at a reduced pressure, and is caused to travel through the body of charged water collected in the lower portion of the carbonator, passing upwardly therethrough into the overlying space in the device. The gas penetrates through the openings 38 in the tubular member 37 and is more or less drawn thereinto by the sucking action of the water discharged into said tube. Because of the force with which the water is injected into the carbonator, violent agitation is produced in the water remaining in the cup 42 so as to effect more thorough absorption of the gas in the water.

When the draft of charged water through the conduit 8 is shut off, the supply 46 thereof begins to accumulate again, the same overflowing from the cup 52 until the volume of charged water 46 is again sufficient to effect closing of the valve 39 incident to a sufficient elevation of the float 45.

Referring to Fig. 1 of the drawing, it will be seen that when the carbonator is actuated to open the valve 39 so as to receive a fresh supply of water, such fresh supply comes from either the chamber 12 of the equalizer or the pump or both. The equalizer serves to compensate variations in pressure produced by the pump 9. It insures delivery of water to the carbonator under a substantially constant pressure whereby uniform results are obtained, i. e., uniformly carbonated water is produced, at all times. By reference to the diagrammatic representation of the equalizing device, it will be seen that when the pump 9 has supplied a sufficient quantity of water to the equalizer chamber 12, the stem 17 will be moved upwardly until the stop 19 thereon engages and actuates the switch lever 20 to break the electric circuit, whereupon the pump motor 26 stops operating the pump 9. Similarly, when the carbonator is actuated and the supply of water in the equalizer chamber 12 is lowered, the switch 21 will be closed so as to operate the pump motor 26 and thereby the pump 9.

The described structure is simple in construction and hence relatively easy and inexpensive to manufacture. It involves no complicated mechanism or mechanism which requires extremely sensitive adjustments Hence it is well adapted for its indicated purposes. The described details of construction may be considerably varied without departing from the spirit of the invention, the scope of which should be determined by reference to the following claims, the same being construed as broadly as possible consistent with the state of the art.

I claim:

1. In a carbonator of the class described, the combination of a receptacle having upper and lower chambers, a hollow member positioned in said upper chamber, means for supplying water under sufficient pressure to the interior of said hollow member to effect comminution of the water therein as an incident to its delivery thereto, valve means for controlling the delivery of water to said hollow member, means for retaining some of said water in said hollow member so as to be subjected to agitation by the delivery of additional water to the receptacle, means for permitting the escape of excess water from the interior of said hollow member into said receptacle, the lower chamber of said receptacle constituting a reservoir for collecting the water which escapes from said hollow member, float means in said lower chamber and controlled by the water collected therein for effecting opening and closing of said valve, and means for supplying gas to said receptacle for absorption by the water comminuted therein, said hollow member being provided with openings for permitting the entrance of said gas thereinto for absorption by the comminuted water therein, and said gas supply means being arranged to introduce the gas into said reservoir below the normal water level therein and at a pressure lower than that of the water supply, thereby to subject the water in said reservoir to contact with gas in movement therethrough, and to facilitate comminution of the water in said hollow member for initial absorption of some of said gas.

2. In a carbonator of the class described, the combination of a receptacle having upper and lower chamber-forming sections, said sections being interconnected and so formed that the respective chambers are laterally offset relative to each other, means in said upper chamber for delivering water thereinto, a valve in said upper chamber for controlling the delivery of water to said upper chamber, means in said upper chamber for effecting comminution of the water delivered thereinto, said lower chamber constituting a reservoir for water received from said upper chamber, a float disposed in the said lower chamber, an arm pivotally connected to said float and extending laterally therefrom into the area of said upper chamber, and a connection between said arm and said valve whereby said valve is adapted to be controlled by the quantity of water in said reservoir, and means for delivering gas into said reservoir.

3. In a carbonator of the class described, the combination of a receptacle, means for supplying gas to said receptacle at a constant pressure, means for supplying water to said receptacle, means controlled by the gas supply for determining and maintaining constant, the pressure under which the water is supplied to said receptacle, valve means for controlling said water supply, means operative as an incident to the withdrawal of carbonated water for controlling said valve means, said valve means being such as to effect delivery of water to said receptacle in a plurality of relatively fine streams, and means adapted to be engaged by said streams for effecting comminution thereof as an incident to their delivery into said receptacle, thereby to facilitate the absorption of said gas by the water.

4. In a carbonator of the class described, a receptacle, means for supplying gas to said receptacle, a hollow member within said receptacle and provided adjacent its upper surface with openings for providing communication between said receptacle and the interior of said hollow member, means for supplying water in one or more streams directed against the inside walls of said hollow member under sufficient pressure to effect substantial comminution of the water incident to its impingement on said inside walls, thereby to facilitate absorption of gas by said water, a cup for receiving the water from said hollow member, said cup being adapted to collect a relatively small quantity of the water and the arrangement being such that the delivery of water from said hollow member to said cup effects substantial agitation and splashing of the water in the cup to facilitate further absorption of gas by the water, said cup being provided with one or more outlet openings permitting the escape of water therefrom as an incident to the delivery of water thereto.

5. In a carbonator, a source of gas supply at high pressure, a carbonating receptacle, means for reducing the pressure of said supply, means for supplying gas to the receptacle at the reduced pressure, a water supply, means for maintaining a constant pressure of water supply, said last-named means being operably responsive to the pressure of the high pressure gas supply, means for supplying water to the receptacle at said constant pressure, and means operably responsive to the level of water in the receptacle for controlling admission of water to the receptacle.

6. In a carbonator of the class described, the combination of a receptacle having upper and lower chamber portions respectively adapted to normally contain gas and carbonated water, a gas supply under pressure, means for delivering gas from said supply to said receptacle at reduced pressure, means for delivering water to said upper chamber portion, valve means for controlling said water delivering means, means for withdrawing carbonated water from said receptacle, means operative as an incident to the withdrawal of carbonated water from said receptacle for controlling said valve means, means for effecting comminution of the water delivered to said upper chamber portion to thereby facilitate absorption by the water of gas contained in said chamber portion, and means controlled by the gas supply pressure for regulating the pressure under which the water is supplied to the receptacle.

CARL J. HOLINGER.